Aug. 22, 1933.  F. J. DOUGLASS  1,923,778
PIPE CUTTING MACHINE
Filed Aug. 27, 1930  6 Sheets-Sheet 1
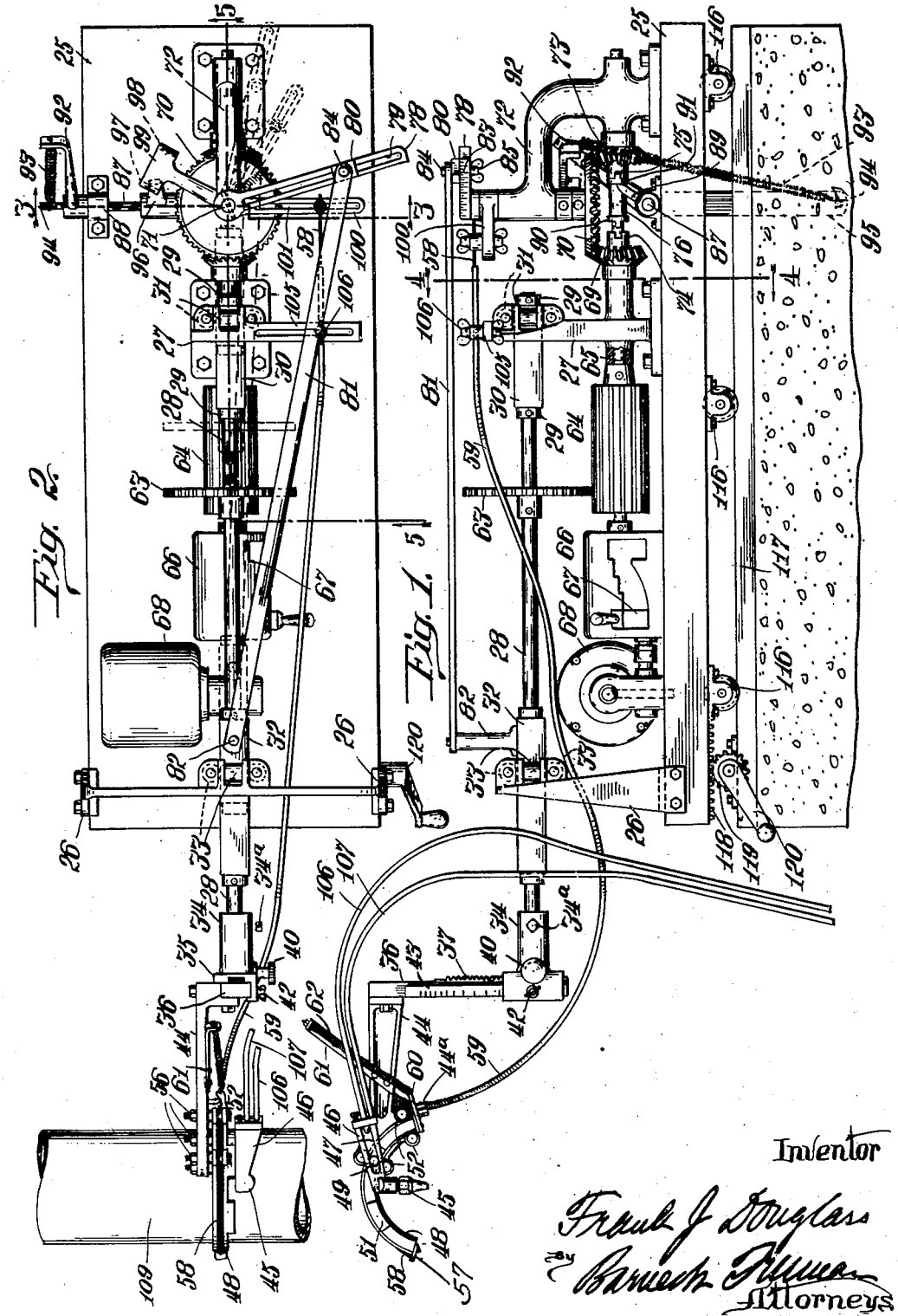
Inventor
Frank J. Douglass
by Barnes & Truman
Attorneys

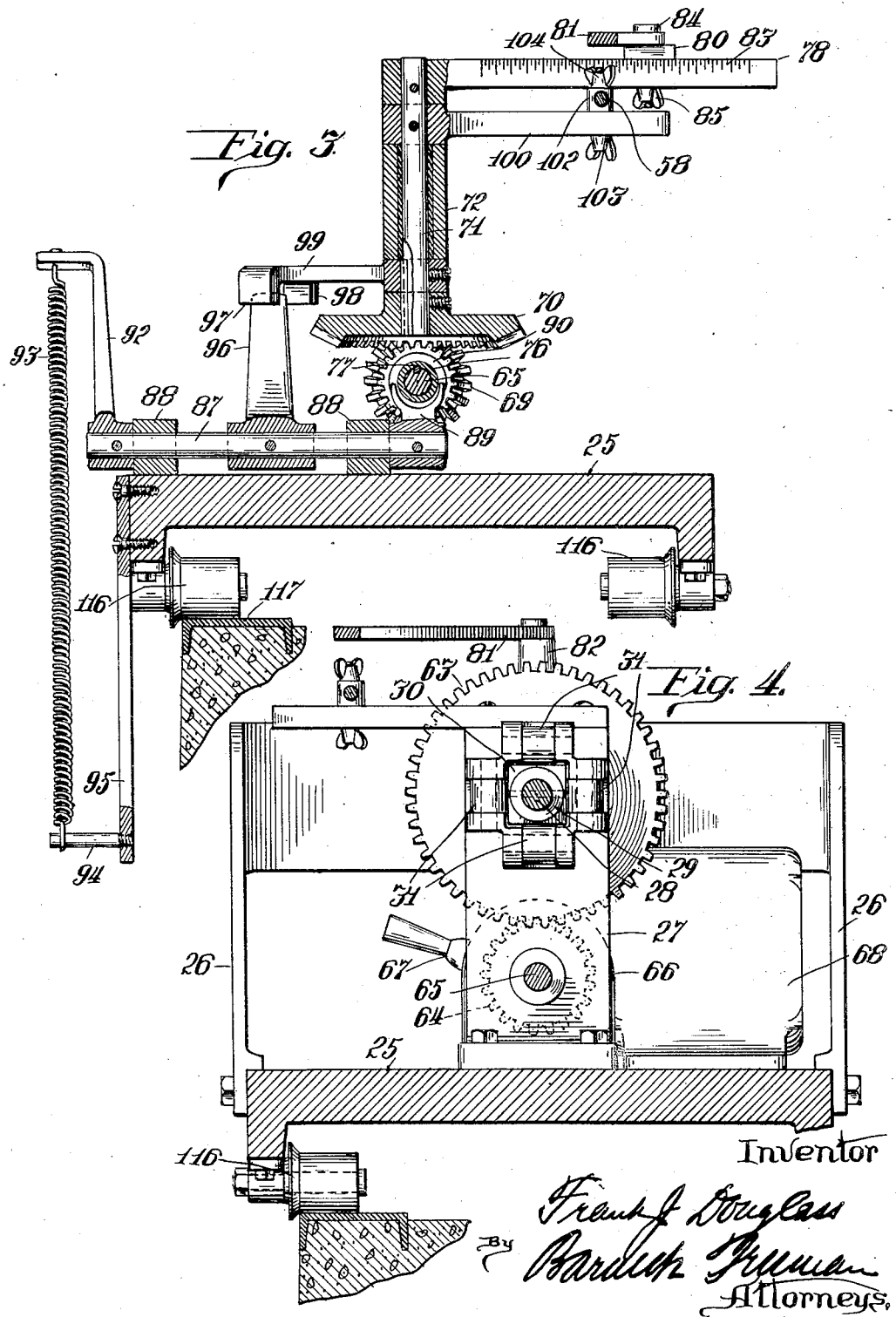

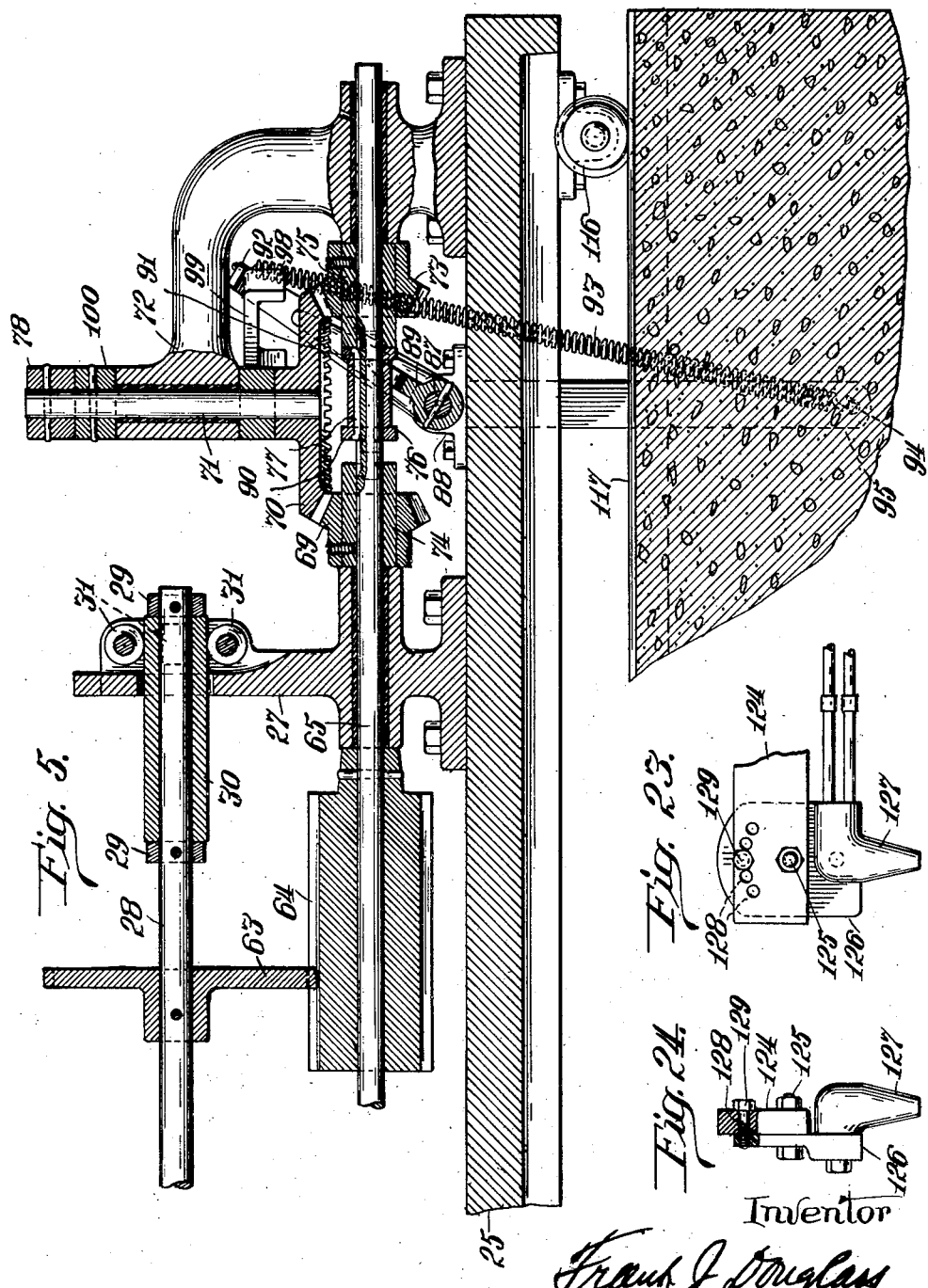

Aug. 22, 1933.    F. J. DOUGLASS    1,923,778
PIPE CUTTING MACHINE
Filed Aug. 27, 1930    6 Sheets-Sheet 4
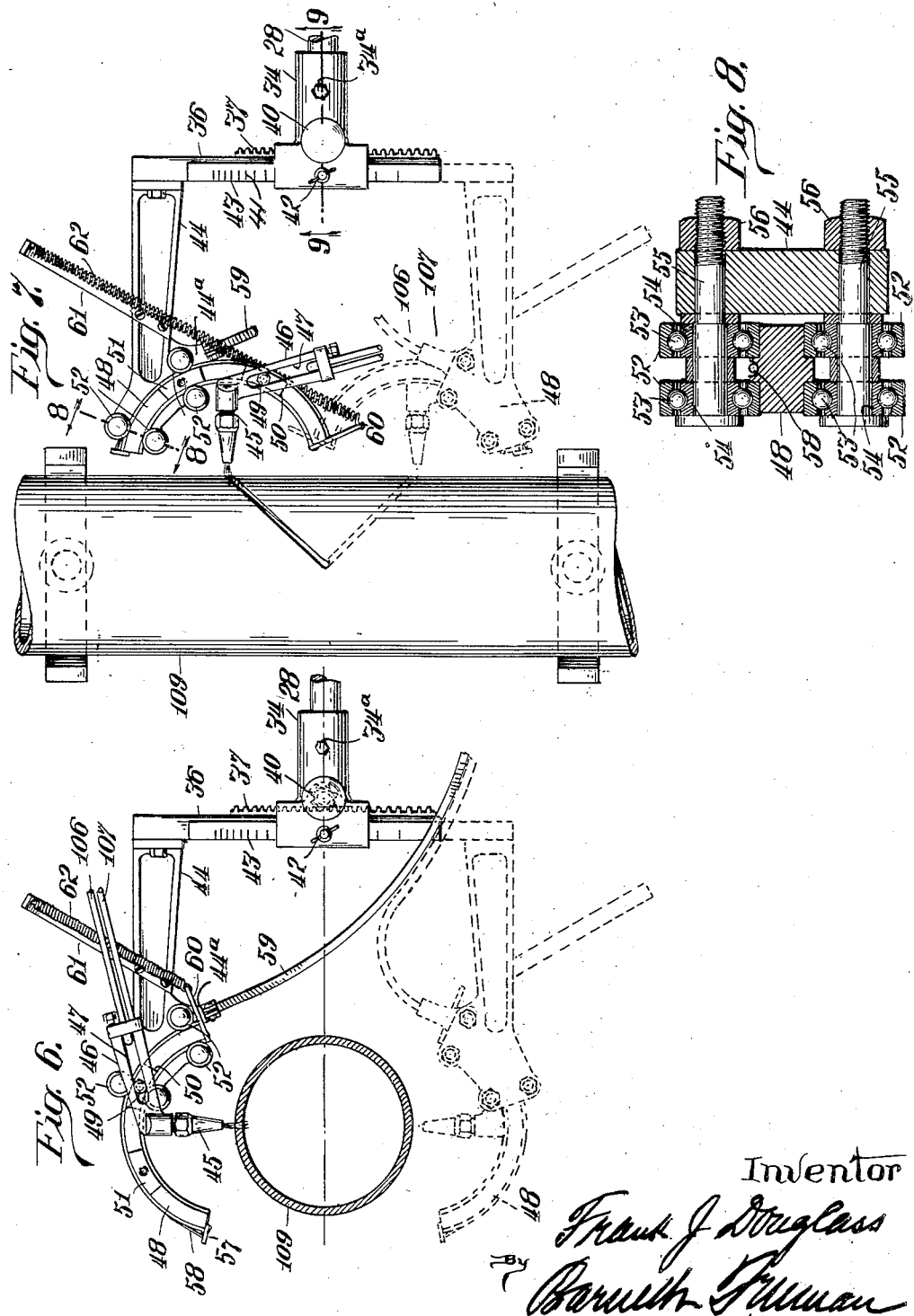

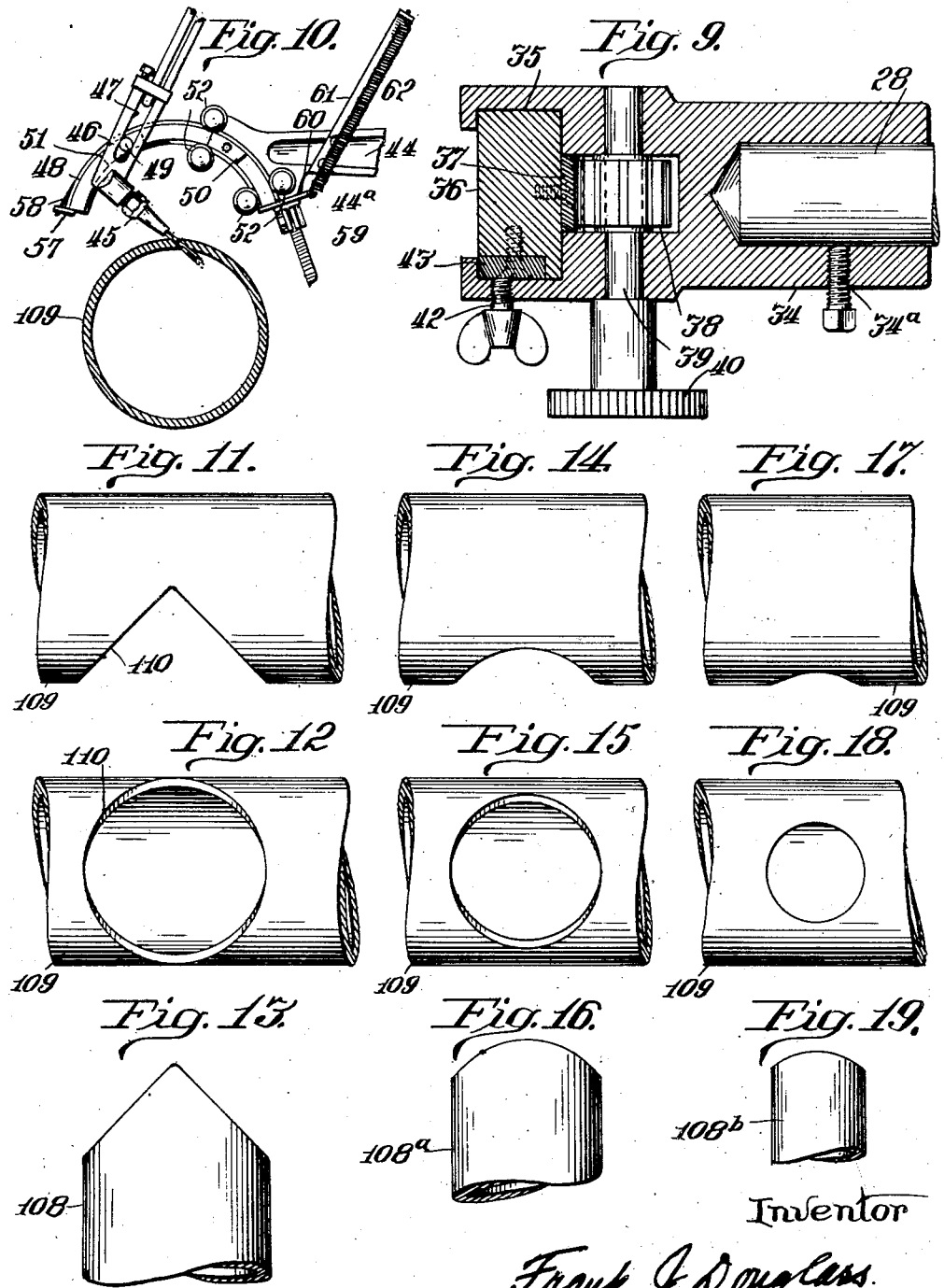

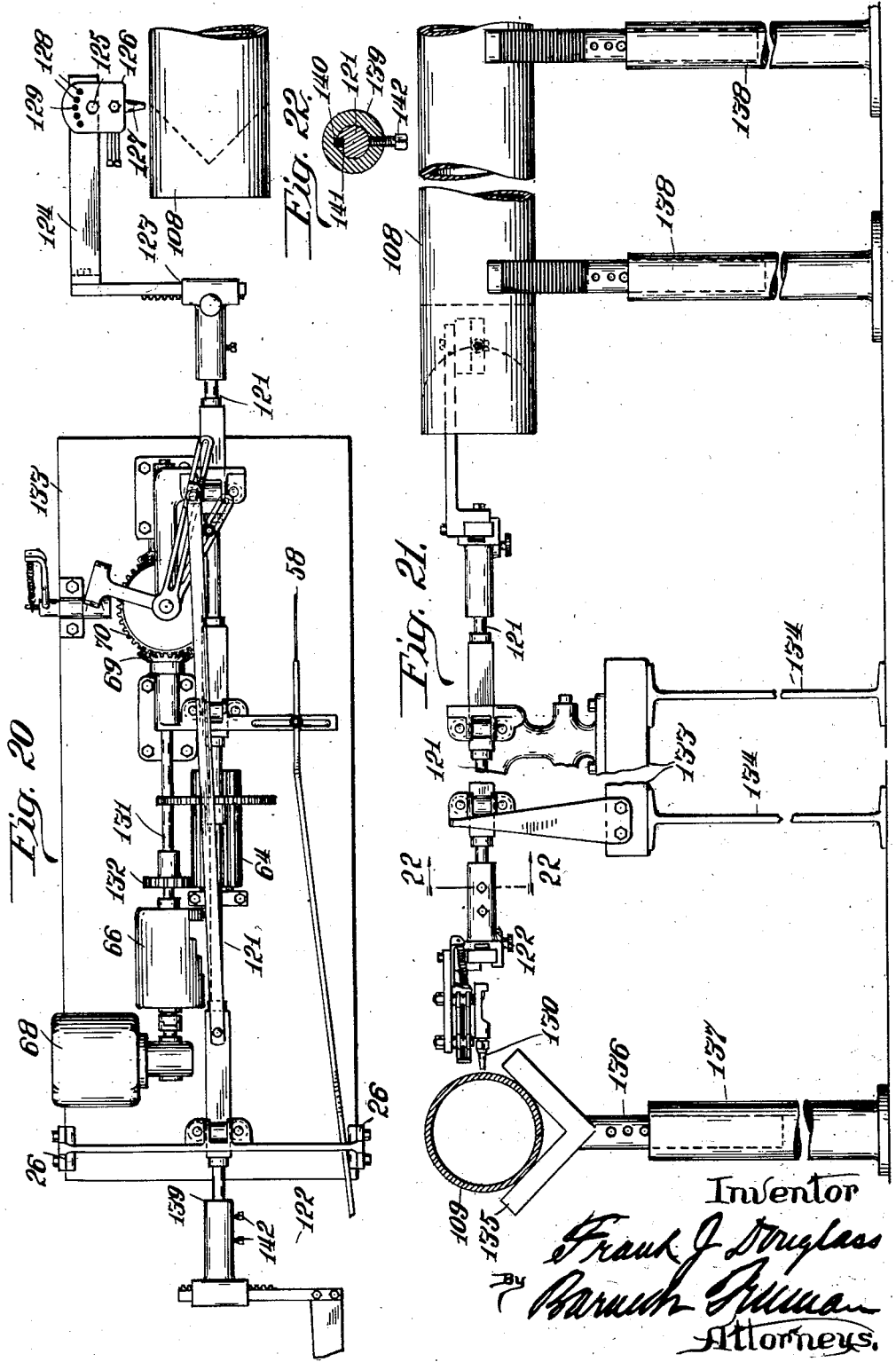

Patented Aug. 22, 1933

1,923,778

UNITED STATES PATENT OFFICE 1,923,778

PIPE CUTTING MACHINE

Frank J. Douglass, Chicago, Ill., assignor to Douglass Brothers Company, Chicago, Ill., a Corporation of Illinois Application August 27, 1930. Serial No. 478,269

21 Claims. (Cl. 266—23)

This invention deals with the cutting of pipes or other cylindrical metal bodies, for example for making T's or crosses or similar joints or connections.

This operation is usually performed by hand and is slow and laborious and involves making templates for each pipe diameter, and for each combination of pipe diameters when one of the pipes is smaller than the other. Furthermore, it is practically impossible to make clean cuts by manual control of the torch, the metal along the cuts being invariably oxidized to a greater or less extent, which results in weak welds unless the cuts are laboriously cleaned or smoothed by a tool after the torch has done its work.

One of the objects of the present invention is to provide a machine for doing this work easily, quickly and automatically and which may be set to handle pipes of various different diameters.

A further object of the invention is to provide a machine which will cut circular openings (circular in projection on a plane) in the sides of pipe sections and will also cut the ends of the corresponding members of the pipe joints to fit said first mentioned openings.

A further object is to provide a machine of this type which will cut an opening in a pipe of any desired diameter up to and including the full diameter of the pipe.

A further object is to provide for setting the torch to bring about impingement of the flame on the pipe at different angles; so that the face of the cut may, for example, be either at right angles to the longest plane at the surface of the pipe or beveled at any suitable angle in respect thereto.

Another object of the invention is to provide for an automatic shifting of the angular position of the cutting torch or other cutting device, with respect to the surface of the pipe (for cutting openings in pipes) so that the cut edge face will have substantially the same angular relation with the cylindrical surface of the pipe throughout the circumference of the cut.

Another object is to provide a machine with a torch operating shaft furnished at each end with a cutting torch or other cutting device, one of which is employed for cutting the opening in the side of the header pipe and the other for making the cut at the end of the corresponding branch pipe. This preferred construction of the machine h  s certain advantages over a machine having only one cutting torch, viz: the branch pipe may be as long as desired (which is not possible with a cutting device designed to cut both headers and branch pipes, since the curves of the cuts are reversed for the header and branch pipes); the two cuts may be made simultaneously, if such operation is desirable; or if that is not desirable, the cutting of the header and branch pipe may be done successively, with idle movement of the torch not used (which of course will not be lighted) but without any change of adjustment of the adjustable devices or the machine, so that the cuts will be uniform and the cut faces will accurately fit one another. In this duplex machine the cutting apparatus at one end is provided with an angularly shiftable torch and at the other end with a torch which may be adjusted to different angular positions for varying the bevel of the cuts, but which does not shift its angular position automatically during the progress of the cutting operation.

A further object of the invention is to provide for adjusting the parts of the machine for operating upon pipes of different diameters.

While the machine contemplated by my invention is designed particularly for making the cuts necessary for the production of welded T's, for example, the machine can also be used (and this increases its practical value) for severing a pipe with circular cut, with an elliptical cut— that is an oblique severance—or for making the so-called orange-peel cuts for bull plugging; these different operations involving, in some cases, certain re-arrangements and adjustments which however will be obvious from the description of the preferred embodiments of the invention in this specification.

Other incidental objects of the invention will be referred to in the following description of the preferred embodiment of the invention illustrated in the accompanying drawings.

In the drawings:

Fig. 1 is a side elevation of an apparatus embodying one form of the invention.

Fig. 2 is a plan view of the same.

Fig. 3, a cross-sectional view on line 3—3 of Fig. 2, with the scale enlarged.

Fig. 4 an enlarged cross-sectional view on line 4—4 of Fig. 1.

Fig. 5, a longitudinal sectional view, with the scale enlarged, on line 5—5 of Fig. 2.

Fig. 6 is a side elevation of the torch carrier end of the machine on a larger scale than Fig. 1 indicating in dotted lines the positions of the torch and torch carrier remote from the positions shown in full lines.

Fig. 7 is a plan view of the apparatus shown in Fig. 6, but with the torch carrier rotated 90°.

Figs. 8 and 9 are sectional views on lines 8—8 and 9—9 of Fig. 7.

Fig. 10 is a detail view of the torch head with the torch adjusted for a beveled cut.

Fig. 11 is a plan view of one section of the pipe joint.

Fig. 12 is a side elevation of this joint.

Fig. 13 is a plan view of the other pipe section cut to join the section shown in Figs. 11 and 12.

Figs. 14, 15 and 16 are views corresponding to Figs. 11, 12 and 13 illustrating the character of the cuts where one of the pipes is of smaller diameter than the other.

Figs. 17, 18 and 19 are views corresponding to Figs. 11, 12 and 13 illustrating the character of the cuts where the smaller pipe is of still less diameter than in Figs. 14, 15 and 16.

Fig. 20 is a plan view of a modified form of a machine in accordance with the invention, in which the operating shaft is provided at each end with a cutting device.

Fig. 21 is a side elevation of the two ends of the machine shown in Fig. 20, the drawing being broken away to omit the middle portion of the machine.

Fig. 22 is a cross-sectional view on line 22—22 of Fig. 21.

Fig. 23 is a rear elevation of the torch carrier shown at the right of Fig. 20.

Fig. 24 is an end elevation, partially broken away, of the structure shown in Fig. 23.

In order to make cuts of the kinds contemplated by this invention, the torch or other cutting device, must move, having reference to its tip or extremity, over a path on a cylinder (using the term cylinder in the geometrical, not in the physical sense) in an orbit compounded of a circular and reciprocating movement, that is the orbit must be described on a cylinder and must be closed, not a spiral, but non-circular.

Referring first to Figs. 1 to 10 of the drawings: 25 designates a base plate provided with upright supports 26, 27 in which is mounted, slidably and revolubly, the operating shaft 28 of the machine. Secured to the rear end of shaft 28 by collars 29, 29 is a box 30, square in cross-section, which operates between two pairs of rollers 31 arranged on the upright supports 27. A similar box 32, square in cross-section, is secured to the shaft 28 near its forward end for engagement with rollers, 33 on the forward upright 26. Secured to the forward extremity of shaft 28 is a torch or pipe cutting device carrier comprising an angular member 34, channeled at 35, as shown in Fig. 9, to receive a slide member 36 provided with a rack 37 adapted to be engaged by a pinion 38 on the stud 39 extending through the guide member 34 and provided with a knob 40. The slide 36 is provided with calibrations, as indicated at 41 inscribed on wear plate 43 (Figs. 1, 6 and 7) for different pipe diameters and is held at the desired adjustment by a locking screw 42 adapted to bear against the wear plate 43 which is set into and secured to the slide 36. The torch carrier 34 is preferably fixed to shaft 28 by set screw 34ª.

The torch carrier member 34 is provided at its outer end with an arm 44 and the cutting torch 45 is provided with an arm 46 formed with a slot 47 and is secured to an arcuate slide 48 by means of a clamping screw 49 which passes through the slot 47 into a block 50, forming part of the slide 48. Two adjustments are shown for the torch on slide 48. When engaged with the block 50, (Fig. 6) the torch will make a cut substantially normal to the cylindrical surface of the pipe; that is, the torch will point toward the axis of the pipe. When engaged with block 51 (Fig. 10) a beveled cut will be made, due to the angular position of the torch in respect to the surface of the pipe. Other adjustments for different bevels may be provided.

The arcuate torch-carrying slide 48 moves endwise between two pairs of rollers 52, 52, the construction and arrangement of which are shown in Fig. 8. The rollers 52 are formed with raceways for anti-friction balls 53 which are arranged around grooved bushings 54 on studs 55 secured by nuts 56 to the arm 44. On one end of the side 48 is an anchorage plate 57 for a wire 58 by which movements are imparted to the head through apparatus to be described, the wire 58 extending through a lug 44ª on the arm 44 and into a flexible sheathing 59 secured to said lug. An upwardly projecting member 61 secured to arm 44 carries a coiled spring 62 which is secured to a plate 60 on the other end of the arcuate slide from the plate 57. This spring which is an optional feature is expanded when the slide is given its angular movement through the rollers 52 and helps to retract the slide to its initial position when wire 58 is released.

In order to cause the torch 45 to follow the desired path over the surface of the pipe to be cut the operating shaft 28 is rotated and at the same time is given reciprocating movements in the directions of its length. Simultaneously with these movements (assuming the cutting of an opening in a header pipe) the arcuate slide 48 which carries the torch is moved through the rollers 52 so as to change the angular position of the torch to compensate for the curvature of the pipe and thereby maintain relatively constant the direction of application of the flame to the surface of the pipe and the formation of an edge face around the opening having the same angular relationship to the surface of the pipe throughout the entire circumference of the opening. This automatic shifting of the angular position of the torch is not required for making the cut at the end of branch section of the joint. In cutting the opening in the header section of the joint, if there were no provision for automatically shifting the angular position of the torch, the correct adjustment of the torch for one point on the circumference of the cut would be incorrect for every other point except the diametrically opposite point. That is, assuming that the face of the cut is normal to the cylindrical surface of the pipe at the point of starting, the torch must be shifted as the cut proceeds to keep the torch pointing constantly to the axis or center line of the pipe; otherwise at points 90° from the point of starting, the flame would be substantially tangent to the pipe, that is, in the case of a cut having a diameter equal to the diameter of the pipe. The same relationship is maintained by the automatic shifting of the angular position of the torch if the torch is adjusted, as shown in Fig. 10, for a beveled cut. In that case the shift is relative to the adjusted position. In any case, the automatic shifting of the arcuate slide 48 compensates for the curvature of the surface on which the cut is made, so that the flame impinges at the same angle upon such surface throughout the entire circumference of the cut.

The mechanism for revolving shaft 28 is as follows: the shaft is provided with a spur gear 63 which meshes with a drum gear 64 on a shaft 65, one end of which turns in bearings on the upright support 27 and the other end of which turns in the frame work 66 of a change speed device 67 interposed between gear 64 and the driving motor 68. The speed changing device is of ordinary construction. It is a necessary part of the present invention if the machine is to be adapted to cut pipes of various diameters and different gauge metal. The gear wheel 63 slides back and forth on the gear 64.

The means for imparting reciprocating movements to the shaft 28 is as follows: On one end of the drive shaft 65 is a beveled pinion 69 meshing with a bevel gear 70 fixed to a vertical shaft 71, revoluble in bearings in a bracket 72, the end of shaft 65 having a bearing also in bracket 72. A beveled pinion 73 is arranged on the shaft 65 and in mesh with the beveled gear 70. The beveled pinions 69 and 73 are secured to sleeves 74, 75, loose on shaft 65, and a clutch member 76, feathered at 77 to shaft 65, is adapted to alternatively clutch pinions 69 and 73 to the drive shaft 65 so as to impart reverse movements of rotation to shaft 71. Shaft 71 has secured thereto a lever arm 78 slotted at 79 (Fig. 1) for adjustment thereon of a pivot block 80 for a link 81, the other end of which link is pivoted to a stud 82 on the forward box 32 on operating shaft 28. The connections of the link are such that the link can be removed for making circular cuts in planes at right angles to the length of the pipe. The arm 78 is calibrated as indicated at 83 (Fig. 3) in accordance with the diameters of the pipes to be operated on, the pivot block 80 being secured to arm 78 by bolt 84 and nut 85.

The clutch member 76 is shifted, automatically, to connect pinion 69 or pinion 73 with the drive shaft and thereby bring about reversals of the direction of rotation of shaft 71 and forward and back movements to the operating shaft 28 through reciprocations of the link 81 by the following mechanism: A rock shaft 87 is mounted in bearings 88, 88 on the base plate 25 (Fig. 3) and carries at its inner end a forked member 89 adapted to engage alternately the heads 90, 91 (Fig. 1) of the clutch member 76. On the other end of rock shaft 87 is an arm 92 to which is secured a coiled spring 93 anchored to a stud 94 on a depending plate 95 secured to the base 25. Rock shaft 87 also carries a finger 96 adapted to be engaged by lugs 97, 98 on an arm 99 secured to the vertical shaft 71. When shaft 71 has rotated far enough in one direction to give the desired longitudinal movement to the operating shaft 28, the angular movement of shaft 71 being approximately 60°, in the preferred construction of the apparatus herein shown and described, one of the lugs 97, 98 engages finger 96 and rocks the shaft 87 so as to move spring 93 beyond center, whereupon the spring completes the movement of the rock shaft and brings about the disengagement of the clutch member 76 from one of the beveled pinions 89, 73 and its engagement with the other of said beveled pinions.

The shifting movements of the arcuate slide 48 carrying the torch are effected as follows: Arm 100 is secured to the vertical shaft 71. This arm is formed with a longitudinal slot 101 for an adjustable member 102 to which the end of wire 58 is secured (Fig. 3). Member 102 has a wing nut 103 for adjusting the device on arm 100 and a wing nut 104 for adjustment of the wire 58. The sheathing 59 of wire 58 is adjusted on a slotted arm 105 on the support 27, 106 designating the adjusting nut (Fig. 1). The flexible tubes for supplying air and gas to the nozzle 45 are indicated at 106, 107.

In Figs. 1, 2, 6, 7 and 10 the machine is shown as operating to cut an opening in the side of a pipe. For cutting the end of a pipe to form the other section of the joint, the movements of the machine are the same except that the pipe operated on, is arranged at 90° from the position of the pipe 109 shown in the other figures and the torch control wire 58 is disconnected from arm 105 so that the angular position of the torch with respect to the torch carrier is not automatically shifted.

The path which the torch must follow in these operations will depend upon the diameter of the pipe section being cut and, in case of a pipe section in which an opening is made, upon the diameter, (in projection) of the opening. The two sections of the joint may be of the same diameter, as indicated in Figs. 11, 12 and 13, in which case the opening 110 in pipe section 109 will have a diameter equal to the diameter of the pipe sections. The machine, however, is capable of making cuts where the other pipe section 108$^a$ or 108$^b$ is smaller than the one in which the opening is made, as shown in Figs. 14 to 19, inclusive. In this case, wire 58 is adjusted so as to give the torch an initial position to the right (Fig. 6) of that shown, the angular position of the torch correspondingly adjusted, and the speed of the machine is increased, since the cut will be shorter. The torch carrier 36 will have to be adjusted in accordance with the diameter of the pipe and the size of the opening, in case of pipe sections in which openings are cut. The adjustment of link 81 on arm 78 is made in accordance with the same variations in diameter of pipe and size of opening.

For cutting headers the pipe must be adjusted to or from the torch; or the torch machine as a whole to or from the pipe, in accordance with the diameter of the pipe operated upon. For the latter type of adjustment the table 25 (Fig. 1) is shown as provided with rollers 116, which run on a track 117, and with a rack 118 engaged by an adjusting pinion 119 rotated by crank 120.

*Duplex machine.*—An embodiment of the invention which is preferred to that just described is illustrated in Figs. 20, 21 and 22, the operating shaft and devices there being shown in Fig. 21 as in a position of 90° from the position of Fig. 20. In this case the operating shaft 121 is provided at the left hand end, (Fig. 20,) with a torch carrier 122 which may be of the same construction and with the same sort of torch 130 thereon as has been described in connection with the machine shown in Figs. 1 to 10, inclusive. That is to say, this cutting apparatus is intended for cutting openings in header pipes so that the torch will be given angular shifting movements as well as circular movements and movements lengthwise of the axis of the operating shaft. The torch carrier 122 is, however, adjustable on shaft 121, to obviate adjustment of the entire machine for pipes of different diameter as required in the apparatus of Figs. 1 to 10. This adjustment will be described hereafter. On the other end of the operating shaft 121 is a torch carrier 123 in general construction like the torch carrier 34, but without any mechanism for shifting the angular position of the torch during cutting operation. This cutting device is intended to operate on the branch pipes of the joints, or upon other pipes intended to be covered transversely. This carrier 123 has an arm 124 to which is pivoted by bolt 125 a block 126 to which the torch 127 is secured. The arm is formed with a series of openings 128 arranged in the arc of a circle, adapted to receive a stud 129 fixed in the block 126. By this arrangement or equivalent arrangement the torch may be adjusted to different angular positions for cuts of different bevel (and by this term I intend to include cuts having edge faces normal to the axis of the pipe as well as oblique cuts) but the torch remains in fixed angular position with respect to the carrier when any adjustment is made.

The mechanism for imparting movements to the operating shaft and for shifting the torch 130 on the torch carrier 122, is the same as the mechanism described in connection with the machine of Figs. 1 to 10, inclusive, except that motor 6t instead of driving shaft 65 carrying gear 64 and beveled pinion 69, drives a shaft 131 provided with a gear wheel 132 which meshes with the long gear 64, on a shaft corresponding in position to shaft 65 of the other machine; the bevel pinion 69 being on shaft 131. This changed arrangement is for the purpose of offsetting the mechanism for effecting longitudinal movements of the operating shaft and shifting movements of the slide 48 so that the operating shaft may be made longer and provided with the torch carrier 123.

In the machine shown in Figs. 20, 21 and 22, the base plate 133 is stationary and supported on fixed supports 134. The header pipe 109 is carried in the blocks 135 provided with perforated standards 136 for adjustment in fixed sockets 137. The branch pipe 108 is supported on similar supports 138 at the other end of the machine. This pipe can be moved to and from the machine to locate the position of the cut, but in order to accommodate the other end of the machine for pipes of different diameter, the torch carrier 122 is made adjustable being provided with a hub 139 furnished with a key 140 which fits into a key-way 141 in the end of the operating shaft 121. The torch carrier is fixed to the shaft 121 in the adjusted position by set screws 142.

*Summary of operation.*—In the case of each machine, the operating shaft 28 or 121 makes a complete revolution, during which it is given, in alternation, two longitudinal movements in opposite direction, the amplitudes of which are determined by the adjustment of link 81 on arm 78. At the same time if an opening is being made in a header pipe, the arcuate slide 48 supporting the torch at the left hand end of the machine is shifted by wire 58, the amplitude of these movements being varied by adjustment of the wire on arm 100. If this cutting apparatus is used for cutting off the end of a pipe, that is, for making the cut on the branch pipe of a T, the wire 58 is disconnected from arm 100. If a circular cut is to be made in a plane at right angles to the axis of the pipe, link 81 is disconnected so that the operating shaft 28 is revolved without being given reciprocating movements. The torch may be adjusted so that the edge face of the cut will be either normal to the surface of the pipe or beveled as may be desired.

The machine of Figs. 20, 21 and 22 operates exactly the same as the machine of Figs. 1 to 10, inclusive, so far as concerns the left hand end of the machine (torch carrier 122) which is employed for cutting openings in the header pipes. The torch carrier on the other end of shaft 121 is intended to operate on the branch pipes of the T connections (or pipes similarly arranged longitudinally with respect to the operating shaft). Under these conditions no automatic shifting of the angular position of the torch is necessary, but the torch is adjustable, angularly, to provide for different degrees of bevel for the edge faces of the cuts. The preferred operation in cutting the two sections of a T is to first cut one section by the apparatus at one end of the machine and then the other section by operation of the apparatus at the other end of the machine. These operations might, however, be carried on simultaneously. When the operations are consecutive, the torch carrier not used may be removed from the operating shaft to prevent unnecessary twisting of the air and gas supply pipes, but, in case of the torch carrier 122, it is not necessary to disengage the wire 58. The great advantage of this duplex machine is that the two parts of a joint may be cut without any change in adjustment of the adjustable parts of the machine, so that the sections of the joint will necessarily fit with perfect accuracy.

It is realized that the principles of my invention might be embodied in other forms of apparatus from those shown and described as typical and preferred; and I desire and intend to cover by patent all modifications and variations within the scope of the appended claims. The torch is in offset arrangement on the operating shaft, by which is meant such an arrangement that when the shaft is revolved the torch will follow a circular path with the axis of the shaft as center of rotation.

I claim:

1. In pipe cutting apparatus the combination of an operating shaft, a cutting torch on said shaft, mechanism for rotating the shaft and imparting longitudinal movement thereto, and remotely operable means for adjusting the angular position of the torch with respect to the shaft to vary the bevel of the cut.

2. In pipe cutting apparatus the combination of an operating shaft, a cutting torch on said shaft, mechanism for rotating the shaft and imparting longitudinal movement thereto, and means for automatically shifting the angular position of the torch as the cutting operation proceeds.

3. In pipe cutting apparatus the combination of an operating shaft, a cutting torch in offset arrangement on said shaft, mechanism for rotating the shaft and imparting longitudinal movement thereto, means for adjusting the angular position of the torch to vary the bevel of the cut, and means for automatically shifting the angular position of the torch from said position of adjustment as the cutting operation proceeds.

4. In pipe cutting apparatus the combination of an operating shaft, an angular torch carrier on said shaft, an arcuate slide on the carrier, a cutting torch on the slide, mechanism for rotating and imparting longitudinal movement to the shaft and means for automatically shifting said slide on the carrier.

5. In pipe cutting apparatus the combination of an operating shaft, an angular torch carrier on the shaft, an arcuate slide on the carrier, a cutting torch adjustable angularly on the slide, mechanism for rotating and imparting longitudinal movement to the shaft and means for automatically shifting said slide on the carrier.

6. In pipe cutting apparatus the combination of an operating shaft, a cutting torch on said shaft, a driving shaft, meshed gears on said shafts one of which is slidable lengthwise of the other, and mechanism operated from said driving shaft for imparting longitudinal movement to the operating shaft.

7. In pipe cutting apparatus the combination of an operating shaft, a torch carrier on said shaft, an arcuate slide on the carrier, a cutting torch on the slide, a driving shaft, meshed gears on said shafts, one of which is slidable lengthwise of the other, mechanism operated from said driving shaft for imparting longitudinal movement to the operating shaft and mechanism operated from said driving shaft for imparting shifting movements to said arcuate slide.

8. In pipe cutting apparatus the combination of an operating shaft, a cutting torch on said shaft, means for revolving said shaft, a rock shaft provided with a beveled gear, a drive shaft, a pair of beveled pinions meshed with said bevel gear and adapted to be alternately clutched to the drive shaft, one arm on the rock shaft, and a link adjustably connected with said arm and engaged with said shaft to impart longitudinal movement thereto.

9. In pipe cutting apparatus the combination of an operating shaft, a cutting torch on said shaft, means for rotating said shaft, and means for imparting longitudinal movements thereto comprising a lever, and a link adjustably engaged with said lever.

10. In pipe cutting apparatus the combination of an operating shaft, a cutting torch in offset arrangement on said shaft, mechanism for rotating the shaft and imparting longitudinal movements thereto, and means for automatically shifting the angular position of the torch as the cutting operation proceeds comprising an arcuate slide on which the torch is mounted and a connector for shifting said slide.

11. In pipe cutting apparatus the combination of an operating shaft, a cutting torch in offset arrangement on said shaft, mechanism for rotating the shaft and imparting longitudinal movements thereto, and means for automatically shifting the angular position of the torch as the cutting operation proceeds comprising an arcuate slide on which the torch is mounted, a connector for shifting said slide in one direction and a spring for moving it in the opposite direction.

12. In pipe cutting apparatus the combination of an operating shaft, pipe cutting devices adapted to be mounted on opposite ends of said shaft and means for simultaneously rotating and giving longitudinal movements to said shaft.

13. In pipe cutting apparatus the combination of an operating shaft, pipe cutting torches movably mounted on opposite ends of said shaft, means for simultaneously rotating and giving longitudinal movements to said shaft, and means for adjusting the angular position of the torches to vary the bevel of the cut.

14. In pipe cutting apparatus the combination of an operating shaft, pipe cutting torches movably mounted on opposite ends of said shaft, means for simultaneously rotating and giving longitudinal movements to said shaft and means for shifting the angular position of one of the torches as the cutting operation proceeds.

15. In pipe cutting apparatus the combination of an operating shaft, a torch carrier on one end of said shaft, an arcuate slide on the carrier, a torch on said slide, means for rotating said shaft, an oscillating arm and link for imparting longitudinal movements to the shaft and an oscillating arm and flexible connector for shifting said slide.

16. In pipe cutting apparatus the combination of a cutting device, means for giving said cutting device a closed non-circular orbit, and means for automatically shifting the angular position of the cutting device to maintain a predetermined angular relation to the surface to be cut as the cutting operation proceeds.

17. In pipe cutting apparatus the combination of a cutting device, means for giving said cutting device a closed non-circular orbit, means for adjusting the angular position of the cutting device to vary the bevel of the cut, and means for automatically shifting the angular position of the cutting device, to maintain said position of adjustment, as the cutting operation proceeds.

18. In pipe cutting apparatus the combination of an operating shaft, a pair of cutting torches one on each end of said shaft, mechanism for rotating the shaft and imparting longitudinal movements thereto, and means for adjusting said apparatus to vary the amplitude of said longitudinal movement.

19. In pipe cutting apparatus the combination of a cutting device, rotary and reciprocating means for moving said cutting device through closed non-circular orbits, and means for maintaining a substantially uniform linear speed of movement of the cutting device as the length of the orbit is changed.

20. In pipe cutting apparatus, an operating shaft, means for rotating the shaft and imparting longitudinal movements thereto, an offset bracket carried by one end of the shaft, a cutting torch mounted on the bracket so as to project a flame inwardly toward the axis of the shaft extended, and means for automatically varying the angle of the torch with respect to the said axis as the torch is revolved about the axis.

21. In a pipe cutting apparatus, an operating shaft, means for rotating the shaft and imparting longitudinal movements thereto, an offset bracket carried at one end of the shaft, a cutting torch carried by the bracket and adapted to project a flame inwardly toward a predetermined line on the pipe to be cut, and means for bodily adjusting the position of the torch on the bracket to vary the angle at which the torch is directed toward the predetermined line of cut.

FRANK J. DOUGLASS.